(12) United States Patent
Fan (10) Patent No.: US 8,365,354 B1
(45) Date of Patent: Feb. 5, 2013

(54) CASTOR HAVING ADJUSTABLE BRAKING FUNCTION

(75) Inventor: Tso-Yu Fan, Yuanlin Township, Changhua County (TW)

(73) Assignee: Der Sheng Co., Ltd., Changhua County (TW)

( * ) Notice: Subject to any disclaimer, the term of this patent is extended or adjusted under 35 U.S.C. 154(b) by 0 days.

(21) Appl. No.: 13/280,426

(22) Filed: Oct. 25, 2011

(51) Int. Cl.
*B60B 33/00* (2006.01)
(52) U.S. Cl. .................. 16/35 R; 16/18 R; 188/1.12
(58) Field of Classification Search .................. 16/18 R, 16/19, 35 R, 35 D, 37–39, 31 R, 31 A, 45; 188/69, 1.12
See application file for complete search history.

(56) References Cited

U.S. PATENT DOCUMENTS

| | | | | |
|---|---|---|---|---|
| 4,658,466 A | * | 4/1987 | Vollberg et al. | 16/35 R |
| 5,112,044 A | * | 5/1992 | Dubats | 482/68 |
| 5,497,856 A | * | 3/1996 | Block et al. | 188/1.12 |
| 6,839,938 B2 | * | 1/2005 | Kausemann | 16/35 R |
| 7,182,178 B2 | * | 2/2007 | Chung | 188/1.12 |
| 7,987,553 B2 | * | 8/2011 | Lin | 16/35 R |
| 8,051,533 B2 | * | 11/2011 | Block et al. | 16/35 R |

FOREIGN PATENT DOCUMENTS

EP  624485 A1 * 11/1994

* cited by examiner

*Primary Examiner* — William L. Miller
(74) *Attorney, Agent, or Firm* — Alan Kamrath; Kamrath IP Lawfirm, P.A.

(57) ABSTRACT

A castor includes a wheel frame, a roller, an elastic locating plate, a mandrel, a locating disk, a braking disk, a mounting tube, an elastic member, a control bar, two screw members, an adjusting member, and a connecting unit. Thus, the distance between the braking disk and the roller can be adjusted easily and quickly according to the user's requirement, thereby facilitating the user braking the roller. In addition, when the wall thickness of the roller is reduced due to rubbing or wearing, the distance between the braking disk and the roller can be adjusted to fit the wall thickness of the roller, thereby keeping the braking effect of the braking disk to the optimum.

5 Claims, 10 Drawing Sheets

CASTOR HAVING ADJUSTABLE BRAKING FUNCTION

BACKGROUND OF THE INVENTION

1. Field of the Invention

The present invention relates to a castor and, more particularly, to a castor for a wheeled vehicle, such as a chair, cart, medical bed and the like.

2. Description of the Related Art

A conventional castor comprises a wheel frame, a roller rotatably mounted on the wheel frame, and a braking plate mounted on the wheel frame and movable to press the roller so as to brake the roller. However, the distance between the braking plate and the roller is fixed and cannot be adjusted so that when the wall thickness of the roller is reduced due to rubbing or wearing during a long-term utilization, the braking disk cannot rub and brake the roller efficiently, thereby decreasing the braking effect of the braking disk.

BRIEF SUMMARY OF THE INVENTION

In accordance with the present invention, there is provided a castor, comprising a wheel frame, an elastic locating plate, a mandrel, a mounting tube, an elastic member, a control bar, two screw members, an adjusting member, and a connecting unit. The wheel frame has a first side provided with a mounting space for mounting a roller and has a second side having a top provided with a mounting post. The mounting post has an outer wall provided with an annular limit groove which has two opposite sides each provided with a screw bore. The mounting post has an inner wall provided with a shaft hole. The mounting post has two opposite sides each provided with a threaded mounting hole connected to the shaft hole. The locating plate is mounted in the mounting space of the wheel frame and is located adjacent to the shaft hole of the mounting post. The mandrel is movably mounted in the shaft hole of the mounting post. The mandrel has a lower end provided with a non-circular mounting section for mounting a locating disk and a braking disk. The mandrel has a mediate portion provided with a stop shoulder located above the mounting section. The mandrel has an upper end provided with a threaded hole. The mounting tube is mounted in a gap defined between the upper end of the mandrel and the shaft hole of the mounting post. The elastic member is mounted on the upper end of the mandrel. The control bar is mounted on the mounting post and consists of two outer shells which are combined with each other. The control bar has an inner wall having an upper end provided with a receiving chamber, a lower end provided with a cylindrical mounting chamber and a mediate portion provided with a receiving recess connected between the receiving chamber and the mounting chamber. The receiving chamber of the control bar has a top provided with a protruding stop portion. The mounting chamber of the control bar has a periphery provided with an annular receiving groove and an annular limit flange located under the receiving groove. The control bar has an upper end provided with a transverse through hole connected to the receiving chamber. The control bar has two opposite sides each provided with a fixing bore extending through the limit flange and aligning with the screw bore of the mounting post. Each of the two screw members is extended through the respective fixing bore of the control bar and is screwed into the respective screw bore of the mounting post to lock the control bar onto the mounting post. The adjusting member is mounted in the receiving chamber of the control bar. The adjusting member has an interior provided with a non-circular control hole aligning with the through hole of the control bar. The adjusting member has a first side provided with a locating lug and a second side provided with a braking lug. The adjusting member has a periphery provided with a release groove located between the locating lug and the braking lug and the locating groove is located between the locating lug and the release groove. The connecting unit is mounted in the control bar and includes a connecting bolt having a lower end provided with a threaded rod screwed into the threaded hole of the mandrel, a fixing block having a bottom connected with a non-circular enlarged upper end of the connecting bolt and a top provided with a slot, and a driven member mounted in the slot of the fixing block and pressed by the adjusting member. The driven member of the connecting unit partially protrudes outward from the top of the fixing block.

The primary objective of the present invention is to provide a castor having an adjustable braking function.

According to the primary advantage of the present invention, the distance between the braking disk and the roller can be adjusted easily and quickly according to the user's requirement, thereby facilitating the user braking the roller.

According to another advantage of the present invention, when the wall thickness of the roller is reduced due to rubbing or wearing during a long-term utilization, the distance between the braking disk and the roller can be adjusted to fit the wall thickness of the roller, thereby keeping the braking effect of the braking disk to the optimum.

According to a further advantage of the present invention, the connecting bolt and the fixing block of the connecting unit are separated from each other so that when the connecting unit is connected with the mandrel and the control bar, the angle of assembly between the connecting unit and the control bar will not be missed, thereby facilitating assembly of the connecting unit and the control bar.

According to a further advantage of the present invention, when each of the two screw members is screwed into the respective screw bore of the mounting post, each of the two screw members abuts and is stopped by the mounting tube so that each of the two screw members will not touch the mandrel to prevent the mandrel from being broken by the two screw members so as to enhance the lifetime of the mandrel.

According to a further advantage of the present invention, when each of the two threaded fastening members is screwed into the respective threaded mounting hole of the mounting post, each of the two threaded fastening members abuts and is stopped by the mounting tube so that each of the two threaded fastening members will not touch the mandrel to prevent the mandrel from being broken by the two threaded fastening members so as to enhance the lifetime of the mandrel.

Further benefits and advantages of the present invention will become apparent after a careful reading of the detailed description with appropriate reference to the accompanying drawings.

DETAILED DESCRIPTION OF THE INVENTION

Referring to the drawings and initially to FIGS. 1-5, a castor in accordance with the preferred embodiment of the present invention comprises a wheel frame 10, an elastic locating plate 15, a mandrel 20, a mounting tube 26, an elastic member 28, a control bar 30, two screw members 372, an adjusting member 40, and a connecting unit 50.

The wheel frame 10 has a first side provided with a mounting space 11 for mounting a roller 12 and has a second side having a top provided with a mounting post 13. The mounting post 13 has an outer wall provided with an annular limit groove 131 which has two opposite sides each provided with a screw bore 132. The mounting post 13 has an inner wall provided with a shaft hole 14. The shaft hole 14 of the mounting post 13 is connected to the mounting space 11 of the wheel frame 10. The mounting post 13 has two opposite sides each provided with a threaded mounting hole 141 connected to the shaft hole 14. The castor further comprises two opposite covers 16 mounted on the wheel frame 10 to cover the roller 12.

The locating plate 15 is mounted in the mounting space 11 of the wheel frame 10 and is located adjacent to the shaft hole 14 of the mounting post 13. The locating plate 15 has a side provided with a locking protrusion 151.

The mandrel 20 is movably mounted in and non-rotatable relative to the shaft hole 14 of the mounting post 13. The mandrel 20 has a lower end provided with a non-circular mounting section 21 for mounting a locating disk 23 and a braking disk 24. The locating disk 23 and the braking disk 24 are movable in the mounting space 11 of the wheel frame 10. The locating disk 23 is movable to engage the locating plate 15, and the braking disk 24 is movable to abut the roller 12. The locating disk 23 has a periphery provided with a locking opening 231 detachably locked onto the locking protrusion 151 of the locating plate 15. The braking disk 24 is located under the locating disk 23 and has a bottom face provided with a plurality of braking bosses 241. The mandrel 20 has a mediate portion provided with an enlarged stop shoulder 22 located above the mounting section 21. The mandrel 20 has an upper end provided with a threaded hole 27. The stop shoulder 22 of the mandrel 20 is located between the upper end of the mandrel 20 and the mounting section 21 of the mandrel 20. The upper end of the mandrel 20 protrudes outward from the shaft hole 14 of the mounting post 13. The mounting section 21 of the mandrel 20 has a distal portion provided with an outer thread 211 onto which a locking nut 212 is screwed. The locking nut 212 abuts the braking disk 24 so that the locating disk 23 and the braking disk 24 are fixed on the mounting section 21 of the mandrel 20 and are limited between the stop shoulder 22 of the mandrel 20 and the locking nut 212. The castor further comprises a spacer 25 mounted on the mounting section 21 of the mandrel 20 and located between the locating disk 23 and the braking disk 24 to space the locating disk 23 from the braking disk 24.

The mounting tube 26 is mounted in a gap defined between the upper end of the mandrel 20 and the shaft hole 14 of the mounting post 13 and is located above the stop shoulder 22 of the mandrel 20.

The elastic member 28 is mounted on the upper end of the mandrel 20 and has a lower end abutting the mounting tube 26.

The control bar 30 is made of aluminum material and consists of two outer shells 31 which are combined with each other to surround the mandrel 20. The control bar 30 is mounted on the mounting post 13. The control bar 30 has an inner wall having an upper end provided with a receiving chamber 33, a lower end provided with a cylindrical mounting chamber 35 and a mediate portion provided with a receiving recess 34 connected between the receiving chamber 33 and the mounting chamber 35. The receiving chamber 33 of the control bar 30 has a top provided with a protruding stop portion 331. The mounting chamber 35 of the control bar 30 surrounds the elastic member 28 and the upper end of the mandrel 20. The mounting chamber 35 of the control bar 30 has a periphery provided with an annular receiving groove 36 to receive a top wall of the limit groove 131 of the mounting post 13 and an annular limit flange 37 located under the receiving groove 36. The limit flange 37 of the control bar 30 is received in the limit groove 131 of the mounting post 13. The control bar 30 has an upper end provided with a transverse through hole 32 connected to the receiving chamber 33. The control bar 30 has two opposite sides each provided with a fixing bore 371 extending through the limit flange 37 and aligning with the screw bore 132 of the mounting post 13.

Each of the two screw members 372 is extended through the respective fixing bore 371 of the control bar 30 and is screwed into the respective screw bore 132 of the mounting post 13 to lock the control bar 30 onto the mounting post 13. Thus, when each of the two screw members 372 is screwed into the respective screw bore 132 of the mounting post 13, each of the two screw members 372 abuts and is stopped by the mounting tube 26 so that each of the two screw members 372 will not touch the mandrel 20.

The adjusting member 40 is mounted in the receiving chamber 33 of the control bar 30. The adjusting member 40 has an interior provided with a non-circular control hole 41 aligning with the through hole 32 of the control bar 30. The adjusting member 40 has a first side provided with a locating lug 43 and a second side provided with a braking lug 44. The adjusting member 40 has a periphery provided with a release groove 42 located between the locating lug 43 and the braking lug 44 and the locating groove 431 is located between the locating lug 43 and the release groove 42.

The connecting unit 50 is mounted in the control bar 30 and includes a connecting bolt 51 having a lower end provided with a threaded rod 511 screwed into the threaded hole 27 of the mandrel 20, a fixing block 52 having a bottom connected with a non-circular enlarged upper end of the connecting bolt 51 and a top provided with a slot 521, and a driven member 53 mounted in the slot 521 of the fixing block 52 and pressed by the adjusting member 40. The upper end of the connecting bolt 51 abuts an upper end of the elastic member 28 so that the elastic member 28 is biased between the upper end of the connecting bolt 51 and the mounting tube 26. The connecting bolt 51 and the fixing block 52 of the connecting unit 50 are received in the receiving recess 34 of the control bar 30. Thus, the connecting bolt 51 and the fixing block 52 of the connecting unit 50 are movable axially and non-rotatable in the receiving recess 34 of the control bar 30. The driven member 53 of the connecting unit 50 partially protrudes outward from the top of the fixing block 52 and is received in the release groove 42 of the adjusting member 40.

In assembly, the mounting post 13 of the wheel frame 10 is mounted on the bottom of a transportation tool, such as a chair, cart, medical bed and the like. Then, a non-circular operation bar (not shown) is extended through the through hole 32 of the control bar 30 and is inserted into the control hole 41 of the adjusting member 40 so that the adjusting member 40 can be operated and rotated by the operation bar. Then, two threaded fastening members (not shown) are extended through the transportation tool and are screwed into the threaded mounting holes 141 of the mounting post 13 to lock the mounting post 13 onto the transportation tool. At this time, when each of the two threaded fastening members is screwed into the respective threaded mounting hole 141 of the mounting post 13, each of the two threaded fastening members abuts and is stopped by the mounting tube 26 so that each of the two threaded fastening members will not touch the mandrel 20.

Figure 1:
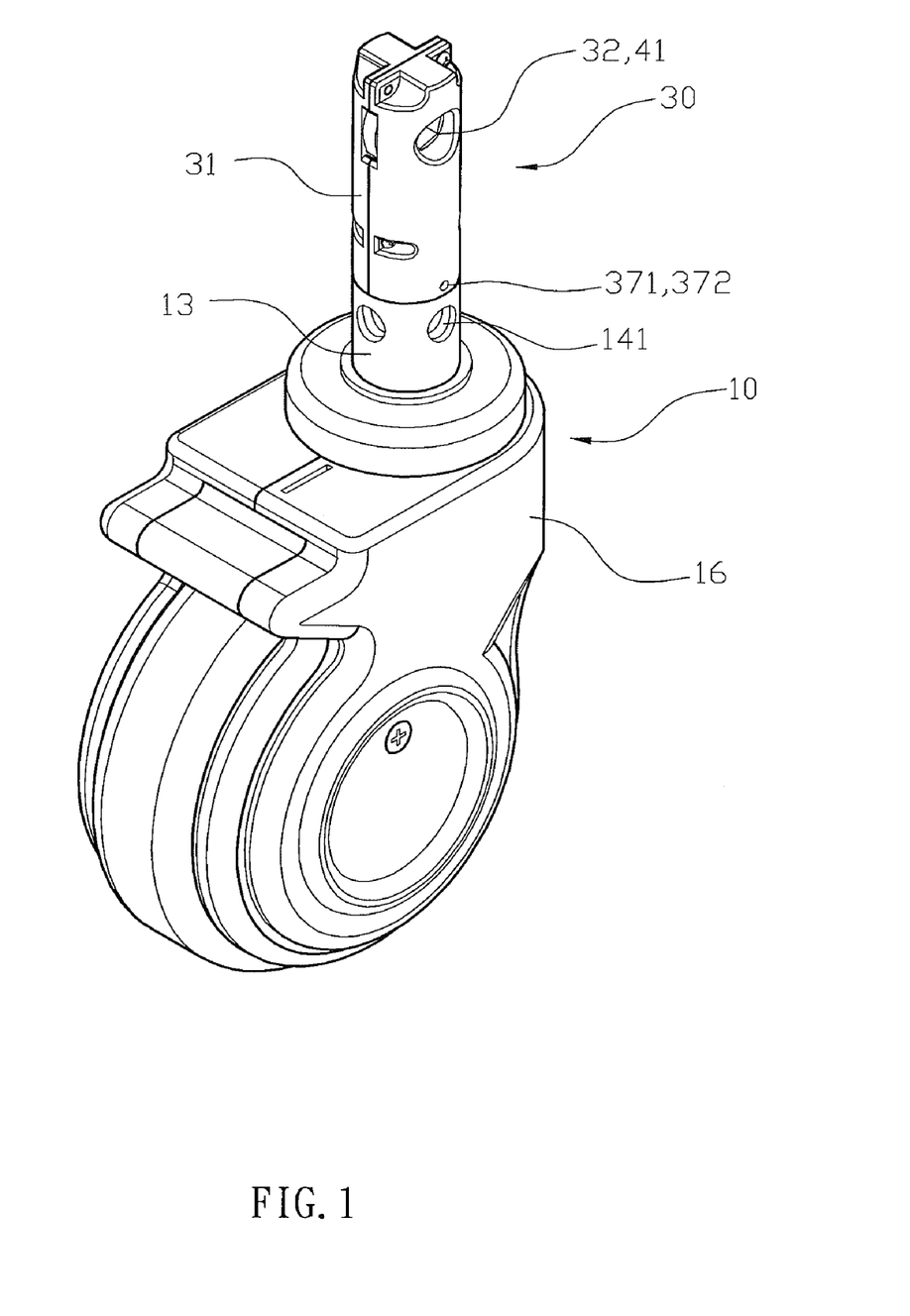
FIG. 1 is a perspective view of a castor in accordance with the preferred embodiment of the present invention.
Figure 2:
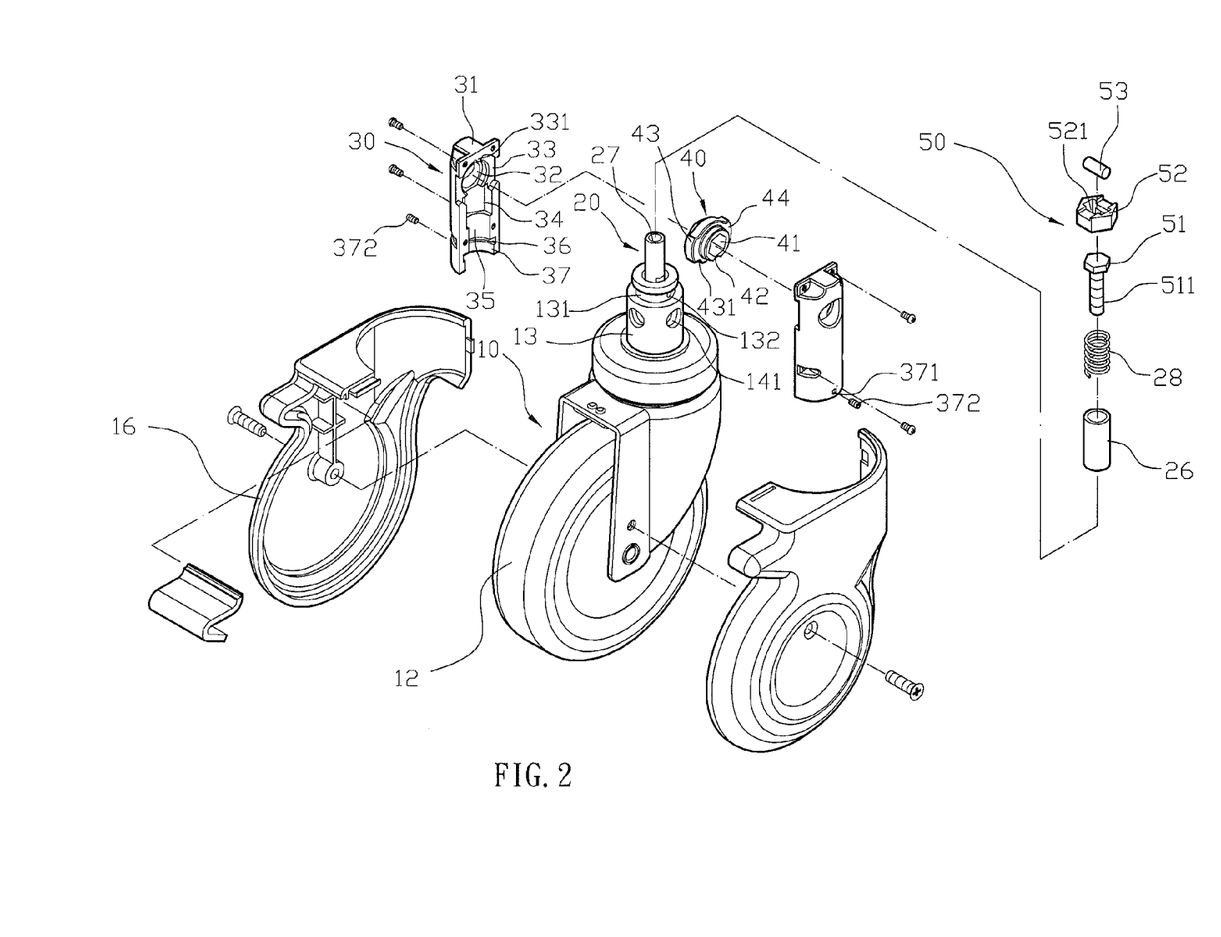
FIG. 2 is a partially exploded perspective view of the castor as shown in FIG. 1.
Figure 3:
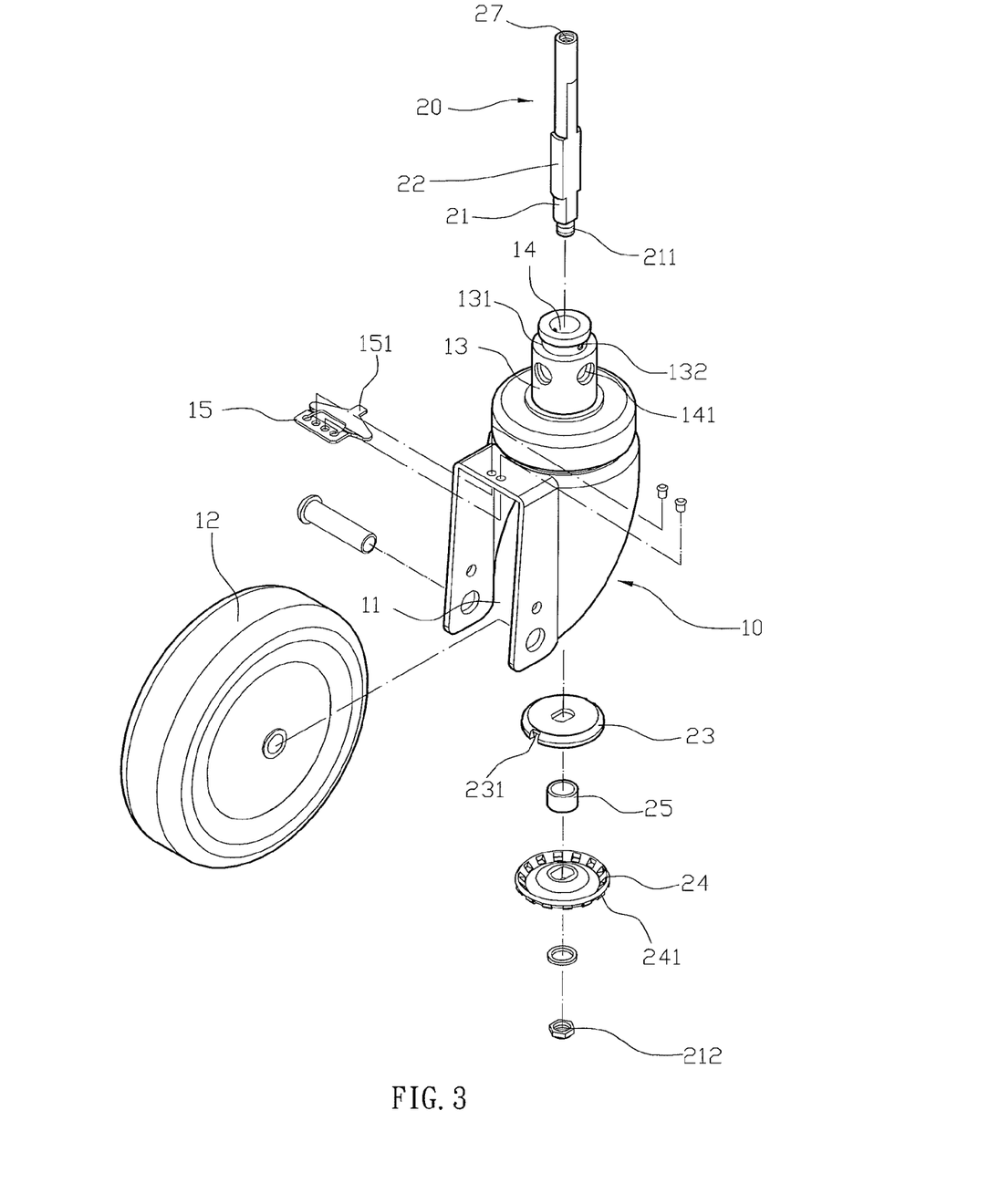
FIG. 3 is a partially exploded perspective view of the castor as shown in FIG. 1.
Figure 4:
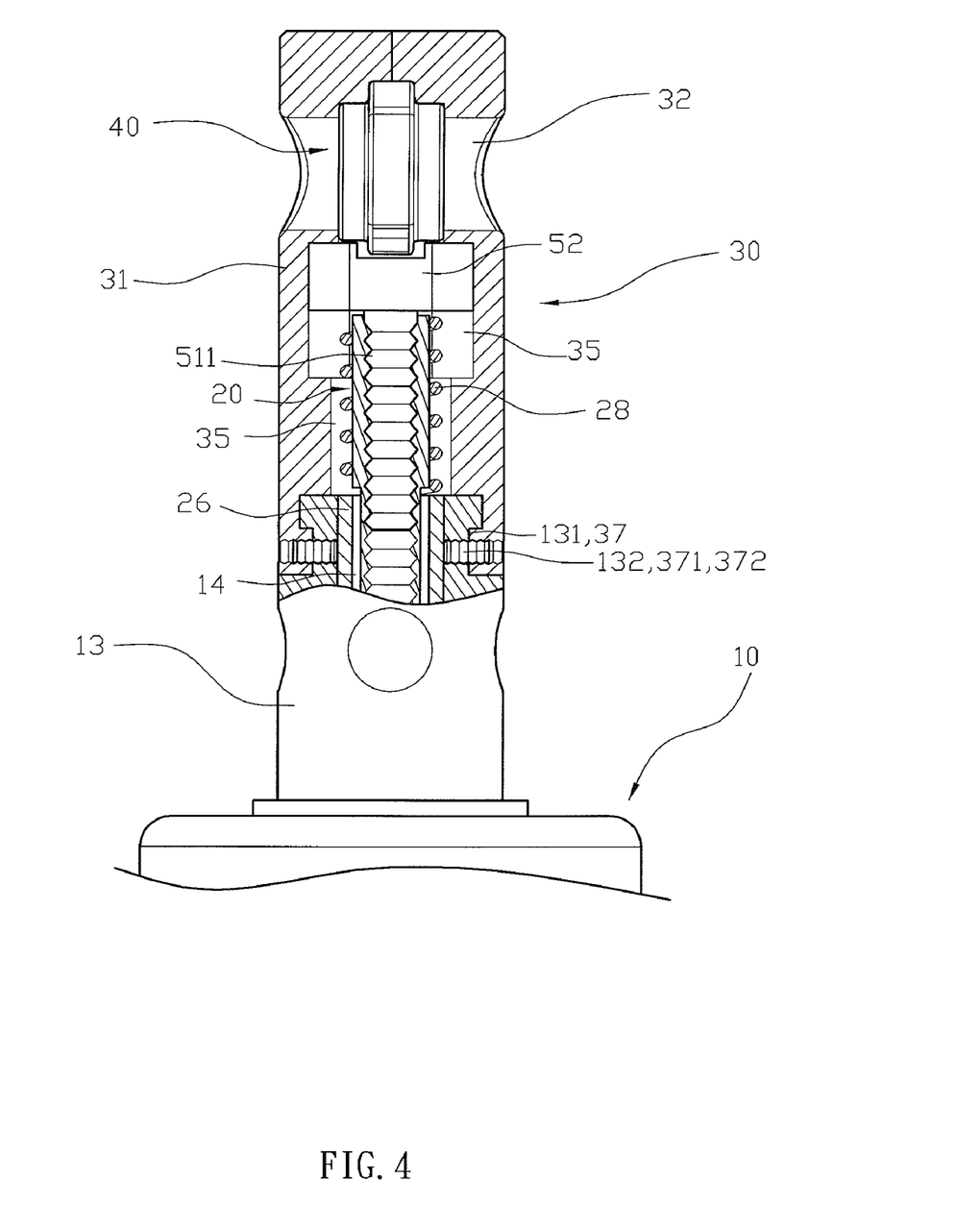
FIG. 4 is a front cross-sectional view of the castor as shown in FIG. 1.
Figure 5:
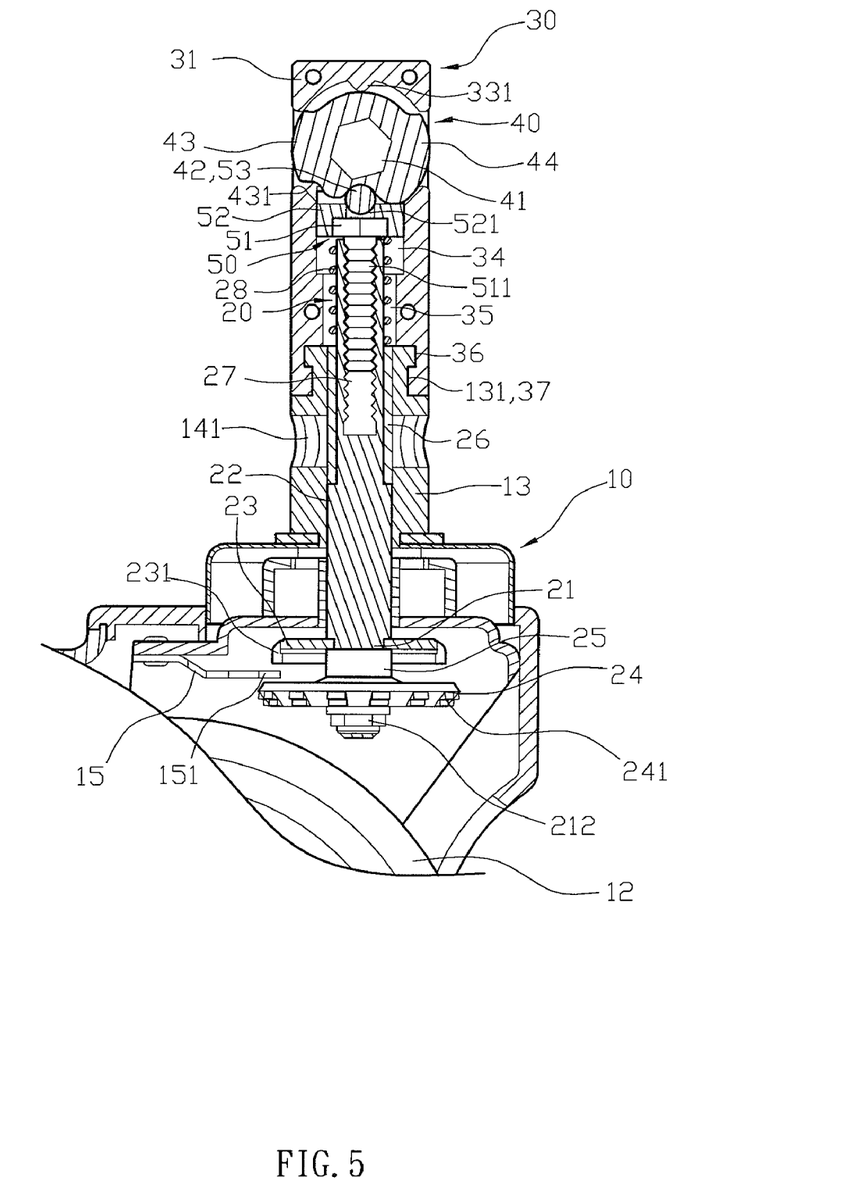
FIG. 5 is a side cross-sectional view of the castor as shown in FIG. 1.

In operation, referring to FIG. 5 with reference to FIGS. 1-4, when the driven member 53 of the connecting unit 50 is received in the release groove 42 of the adjusting member 40, the connecting bolt 51 of the connecting unit 50 is moved upward by the elastic force of the elastic member 28 to lift the mandrel 20 so that the locating disk 23 is lifted to detach from the locating plate 15, and the braking disk 24 is lifted to detach from the roller 12. Thus, the wheel frame 10 can be turned freely, and the roller 12 can be rotated freely.

Figure 6:
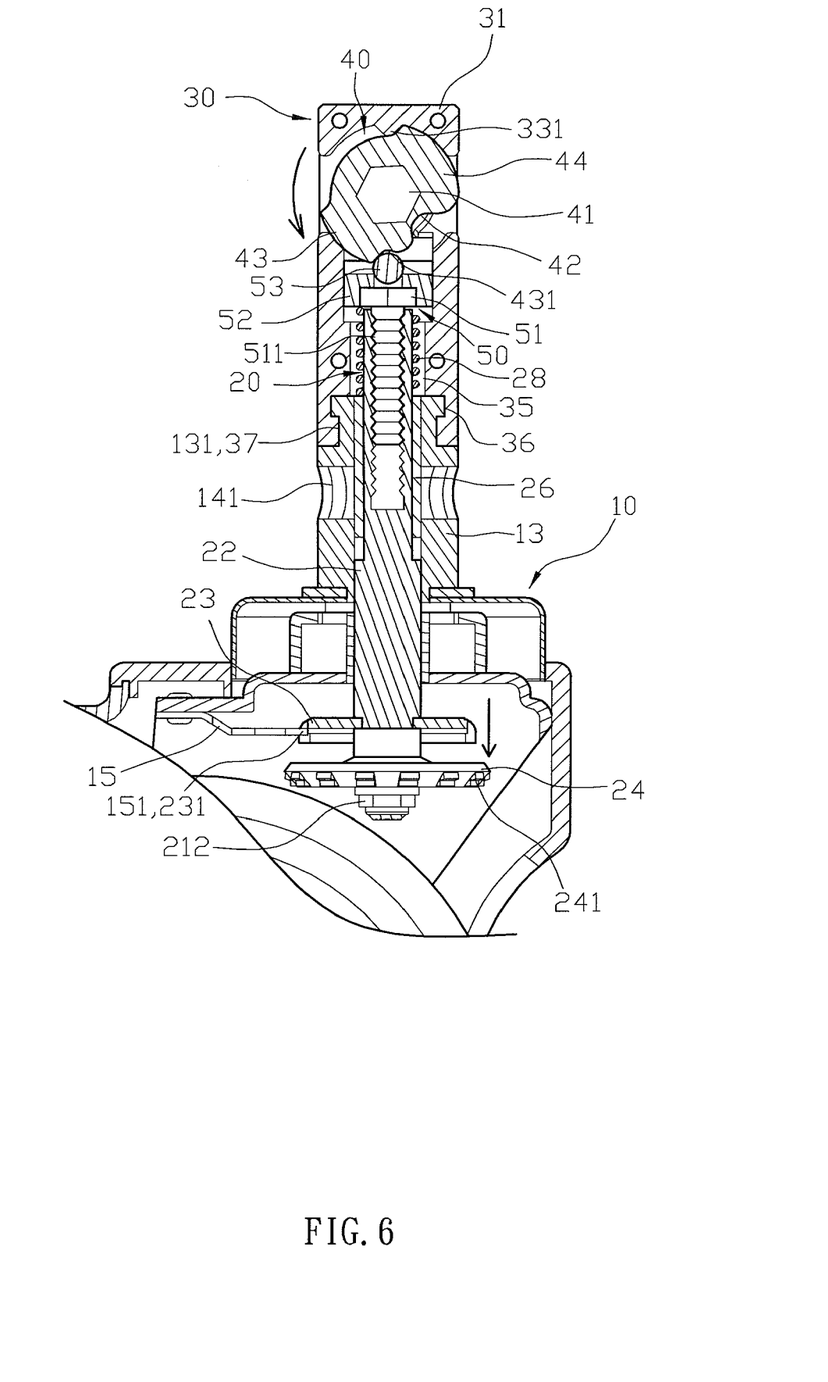
FIG. 6 is a schematic operational view of the castor as shown in FIG. 5.

Referring to FIG. 6 with reference to FIGS. 1-5, after the roller 12 is turned to a predetermined position, the adjusting member 40 is rotated in the positive direction, e.g., in the counterclockwise direction, from the position as shown in FIG. 5 to the position as shown in FIG. 6, so that the driven member 53 of the connecting unit 50 is received in the locating groove 431 of the adjusting member 40. In such a manner, the driven member 53 of the connecting unit 50 is pressed by the adjusting member 40 to move the connecting bolt 51 downward and to lower the mandrel 20 so that the locating disk 23 is lowered to engage the locating plate 15, and the locking opening 231 of the locating disk 23 is locked onto the locking protrusion 151 of the locating plate 15. Thus, the wheel frame 10 is locked by the locating disk 23 so that the wheel frame 10 is located and cannot be turned any more, and the roller 12 can be rotated linearly to translate the transportation tool in a linear manner. At this time, the braking lug 44 of the adjusting member 40 is movable to abut the stop portion 331 of the control bar 30 so as to stop a further rotation of the adjusting member 40.

Figure 7:
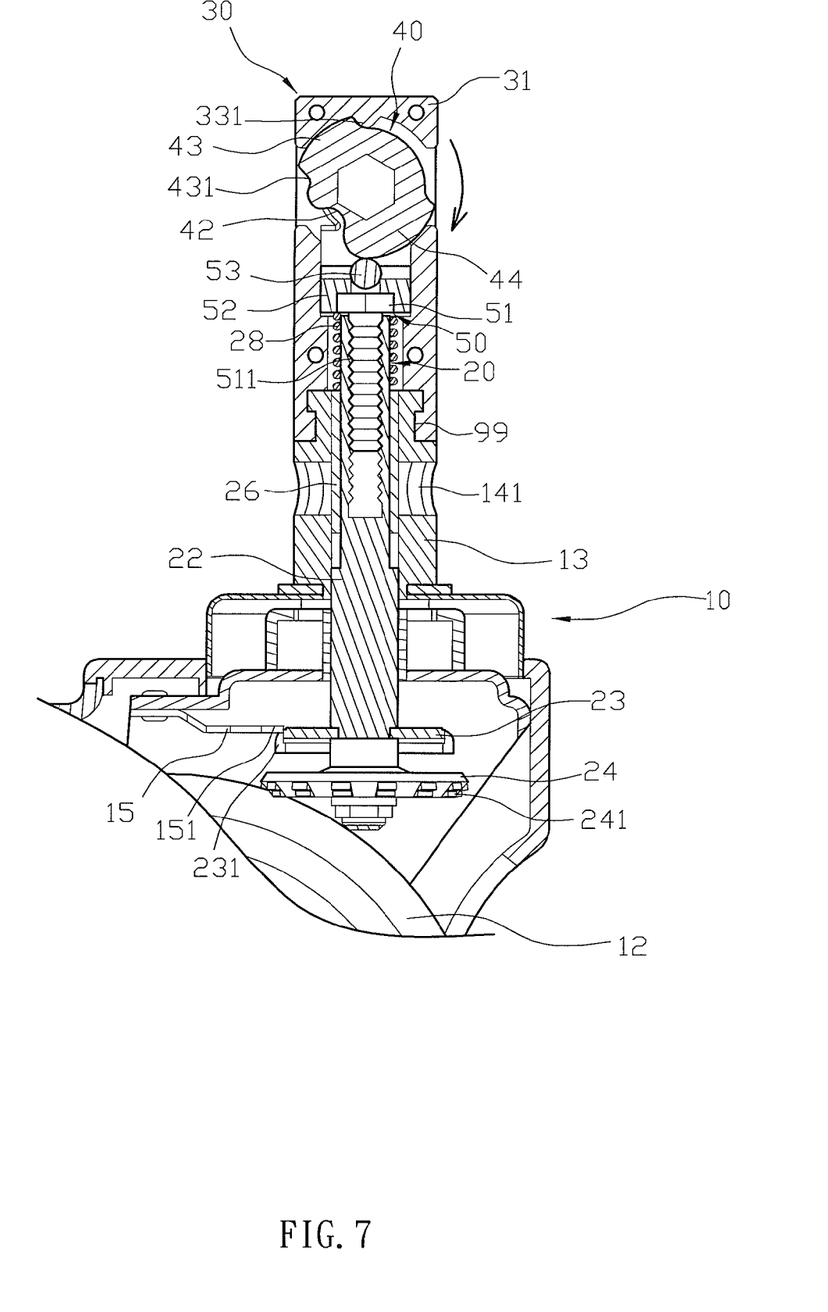
FIG. 7 is a schematic operational view of the castor as shown in FIG. 5.

Referring to FIG. 7 with reference to FIGS. 1-6, when the adjusting member 40 is rotated in the opposite direction, e.g., in the clockwise direction, from the position as shown in FIG. 5 to the position as shown in FIG. 7, the driven member 53 of the connecting unit 50 is pressed by the braking lug 44 of the adjusting member 40. The braking lug 44 of the adjusting member 40 has a thickness greater than that of the locating groove 431 of the adjusting member 40 so that the braking lug 44 of the adjusting member 40 can press the driven member 53 of the connecting unit 50 downward. In such a manner, the driven member 53 of the connecting unit 50 is pressed by the braking lug 44 of the adjusting member 40 to further move the connecting bolt 51 downward and to further lower the mandrel 20 so that the braking disk 24 is lowered to press the roller 12, and the braking bosses 241 of the braking disk 24 engage the surface of the roller 12. At the same time, the locating disk 23 still engages the locating plate 15. Thus, the roller 12 is braked by the braking disk 24, and the wheel frame 10 is locked by the locating disk 23 simultaneously. At this time, the locating lug 43 of the adjusting member 40 is movable to abut the stop portion 331 of the control bar 30 so as to stop a further rotation of the adjusting member 40.

Figure 8:
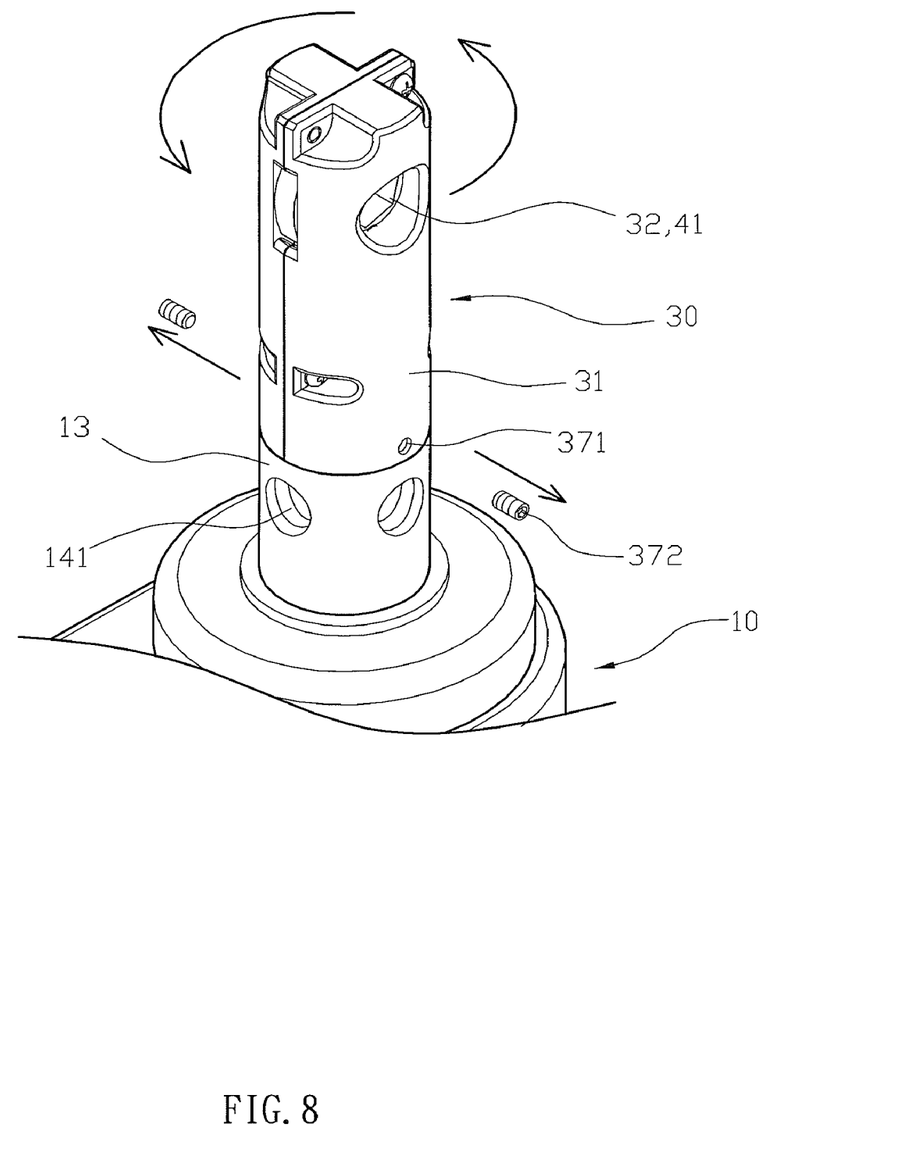
FIG. 8 is a schematic operational view of the castor as shown in FIG. 1.
Figure 9:
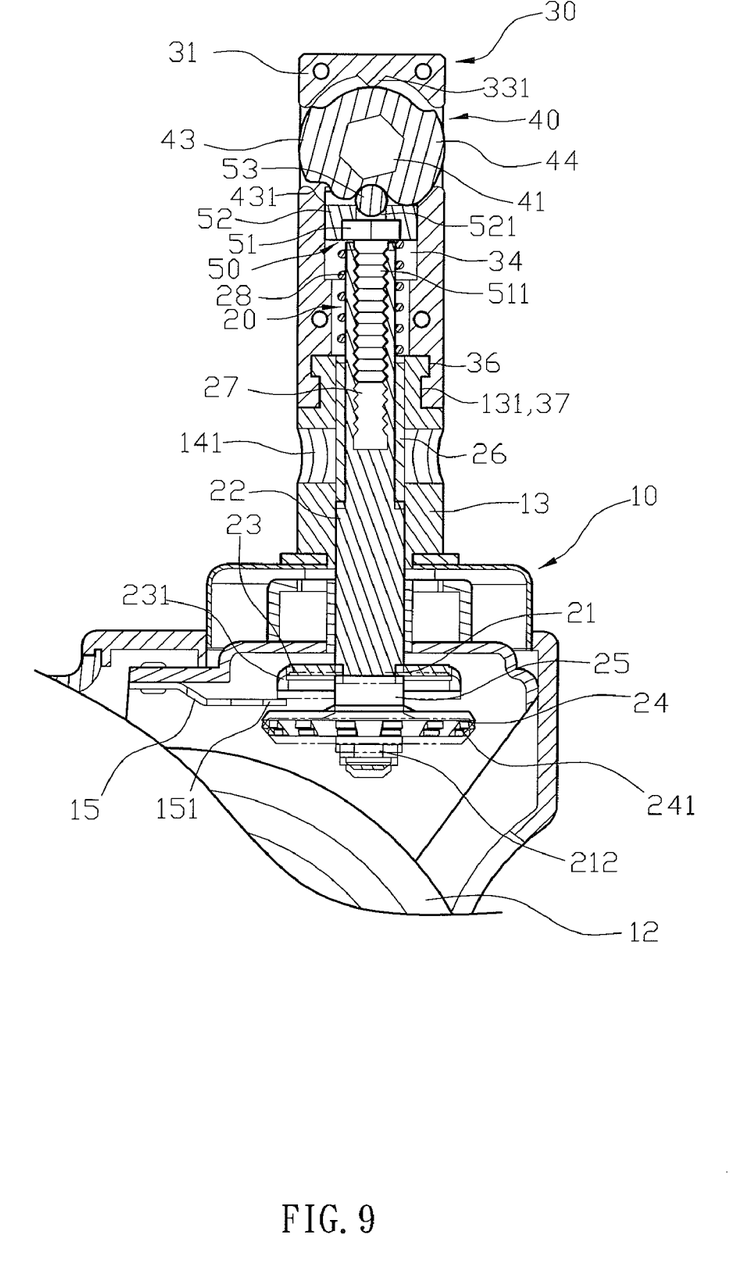
FIG. 9 is a schematic operational view of the castor as shown in FIG. 5.
Figure 10:
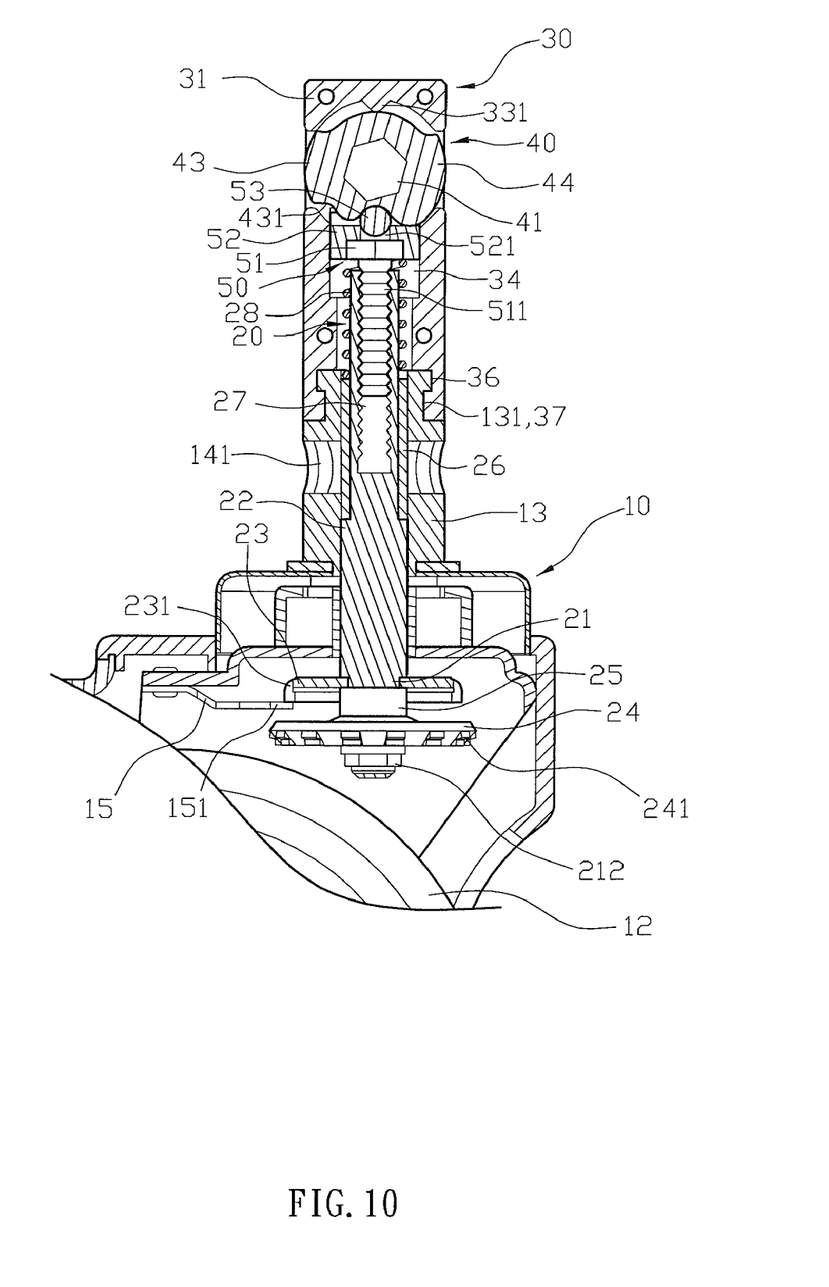
FIG. 10 is a schematic operational view of the castor as shown in FIG. 9.

Referring to FIGS. 8-10 with reference to FIGS. 1-5, when a user wishes to adjust the distance between the braking disk 24 and the roller 12, the castor is removed from the transportation tool. Then, each of the two screw members 372 is unscrewed from the respective screw bore 132 of the mounting post 13 to unlock the control bar 30 from the mounting post 13 so that the control bar 30 can be swiveled relative to the mounting post 13. In such a manner, the connecting bolt 51 and the fixing block 52 of the connecting unit 50 are rotated by the control bar 30 when the control bar 30 is rotated relative to the mounting post 13. At this time, the threaded rod 511 of the connecting bolt 51 is screwed into the threaded hole 27 of the mandrel 20, and the mandrel 20 is non-rotatable relative to the shaft hole 14 of the mounting post 13, so that when the connecting bolt 51 is rotated, the mandrel 20 is limited to move axially in the shaft hole 14 of the mounting post 13. Thus, the mandrel 20 can be moved axially by rotation of the control bar 30 to move the braking disk 24 upward and downward so as to adjust the distance between the braking disk 24 and the roller 12.

Accordingly, the distance between the braking disk 24 and the roller 12 can be adjusted easily and quickly according to the user's requirement, thereby facilitating the user braking the roller 12. In addition, when the wall thickness of the roller 12 is reduced due to rubbing or wearing during a long-term utilization, the distance between the braking disk 24 and the roller 12 can be adjusted to fit the wall thickness of the roller 12, thereby keeping the braking effect of the braking disk 24 to the optimum. Further, the connecting bolt 51 and the fixing block 52 of the connecting unit 50 are separated from each other so that when the connecting unit 50 is connected with the mandrel 20 and the control bar 30, the angle of assembly between the connecting unit 50 and the control bar 30 will not be missed, thereby facilitating assembly of the connecting unit 50 and the control bar 30. Further, when each of the two screw members 372 is screwed into the respective screw bore 132 of the mounting post 13, each of the two screw members 372 abuts and is stopped by the mounting tube 26 so that each of the two screw members 372 will not touch the mandrel 20 to prevent the mandrel 20 from being broken by the two screw members 372 so as to enhance the lifetime of the mandrel 20. Further, when each of the two threaded fastening members is screwed into the respective threaded mounting hole 141 of the mounting post 13, each of the two threaded fastening members abuts and is stopped by the mounting tube 26 so that each of the two threaded fastening members will not touch the mandrel 20 to prevent the mandrel 20 from being broken by the two threaded fastening members so as to enhance the lifetime of the mandrel 20.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A castor, comprising a wheel frame, an elastic locating plate, a mandrel, a mounting tube, an elastic member, a control bar, two screw members, an adjusting member, and a connecting unit, wherein:

the wheel frame has a first side provided with a mounting space receiving a roller and has a second side having a top provided with a mounting post;

the mounting post has an outer wall provided with an annular limit groove which has two opposite sides each provided with a screw bore;

the mounting post has an inner wall provided with a shaft hole;

the mounting post has two opposite sides each provided with a threaded mounting hole connected to the shaft hole;

the elastic locating plate is mounted in the mounting space of the wheel frame and is located adjacent to the shaft hole of the mounting post;

the mandrel is movably mounted in the shaft hole of the mounting post;

the mandrel has a lower end provided with a non-circular mounting section receiving a locating disk and a braking disk;

the mandrel has a mediate portion provided with a stop shoulder located above the non-circular mounting section;

the mandrel has an upper end provided with a threaded hole;

the mounting tube is mounted in a gap defined between the upper end of the mandrel and the shaft hole of the mounting post;

the elastic member is mounted on the upper end of the mandrel;

the control bar is mounted on the mounting post and includes two outer shells which are combined with each other;

the control bar has an inner wall having an upper end provided with a receiving chamber, a lower end provided with a cylindrical mounting chamber and a mediate portion provided with a receiving recess connected between the receiving chamber and the cylindrical mounting chamber;

the receiving chamber of the control bar has a top provided with a protruding stop portion;

the cylindrical mounting chamber of the control bar has a periphery provided with an annular receiving groove and an annular limit flange located under the annular receiving groove;

the control bar has an upper end provided with a transverse through hole connected to the receiving chamber;

the control bar has two opposite sides each provided with a fixing bore extending through the annular limit flange and aligning with the screw bore of the mounting post;

each of the two screw members is extended through the respective fixing bore of the control bar and is screwed into the respective screw bore of the mounting post to lock the control bar onto the mounting post;

the adjusting member is mounted in the receiving chamber of the control bar;

the adjusting member has an interior provided with a non-circular control hole aligning with the transverse through hole of the control bar;

the adjusting member has a first side provided with a locating lug and a second side provided with a braking lug;

the adjusting member has a periphery provided with a release groove located between the locating lug and the braking lug and the locating groove is located between the locating lug and the release groove;

the connecting unit is mounted in the control bar and includes:
  a connecting bolt having a lower end provided with a threaded rod screwed into the threaded hole of the mandrel;
  a fixing block having a bottom connected with a non-circular enlarged upper end of the connecting bolt and a top provided with a slot; and
  a driven member mounted in the slot of the fixing block and pressed by the adjusting member; and
the driven member of the connecting unit partially protrudes outward from the top of the fixing block.

2. The castor of claim 1, wherein
the locating disk is movable to engage the elastic locating plate;
the braking disk is movable to abut the roller;
the elastic locating plate has a side provided with a locking protrusion;
the locating disk has a periphery provided with a locking opening detachably locked onto the locking protrusion of the elastic locating plate;
the braking disk is located under the locating disk and has a bottom face provided with a plurality of braking bosses engaging the roller;
the stop shoulder of the mandrel is located between the upper end of the mandrel and the non-circular mounting section of the mandrel;
the elastic member has a lower end abutting the mounting tube;
the mounting tube is located above the stop shoulder of the mandrel;
the annular limit flange of the control bar is received in the annular limit groove of the mounting post;
the non-circular enlarged upper end of the connecting bolt abuts an upper end of the elastic member, wherein the elastic member is biased between the non-circular enlarged upper end of the connecting bolt and the mounting tube.

3. The castor of claim 1, further comprising two opposite covers mounted on the wheel frame to cover the roller.

4. The castor of claim 1, wherein
the non-circular mounting section of the mandrel has a distal portion provided with an outer thread onto which a locking nut is screwed;
the locking nut abuts the braking disk, wherein the locating disk and the braking disk are fixed on the non-circular mounting section of the mandrel and are limited between the stop shoulder of the mandrel and the locking nut.

5. The castor of claim 1, further comprising a spacer mounted on the non-circular mounting section of the mandrel and located between the locating disk and the braking disk to space the locating disk from the braking disk.

* * * * *